United States Patent [19]

Woodle

[11] 3,720,096

[45] March 13, 1973

[54] METHOD AND APPARATUS FOR MONITORING THE MOLECULAR WEIGHT OF HYDROCARBON MIXTURES

[75] Inventor: Robert A. Woodle, Nederland, Tex.

[73] Assignee: Texaco Inc., New York, N.Y.

[22] Filed: Nov. 25, 1970

[21] Appl. No.: 92,619

[52] U.S. Cl. ...................................................73/53
[51] Int. Cl. ............................................G01n 11/00
[58] Field of Search...................................73/53, 32

[56] References Cited

UNITED STATES PATENTS

| | | | |
|---|---|---|---|
| 3,090,222 | 5/1963 | Akaboshi et al.........................73/53 |
| 2,964,993 | 12/1960 | Witt..................................73/32 UX |
| 2,357,003 | 8/1944 | Hurndall..............................73/32 X |
| 3,145,559 | 8/1964 | Banks.....................................73/32 |

*Primary Examiner*—Louis R. Prince
*Assistant Examiner*—Joseph W. Roskos
*Attorney*—Thomas H. Whaley and Carl G. Reis

[57] ABSTRACT

A method for determining the molecular weight of hydrocarbons wherein the Watson-Nelson characterization factor has been determined from the sensing of gravity and viscosity to provide first and second signals, respectively, corresponding to the Saybolt viscosity and API gravity and a third signal corresponding to the characterization factor. The signals are then combined in accordance with the following equation:

$$MW = \exp\{\ln[\exp(a+bK) + \exp(c+dK)] + m(G-30)\}$$

where:

$MW$ = the molecular weight of the hydrocarbon mixture; $K$ = the Watson-Nelson characterization factor of the hydrocarbon mixture; $G$ = the API gravity of the hydrocarbon mixture at 60°F; and $a,b,c,d$, and $m$ are predetermined constants;

and where the abbreviations ln = natural logarithm of; exp = $e$ raised to the power; and $e$ is the base of the natural logarithms.

4 Claims, 2 Drawing Figures

னி3,720,096

METHOD AND APPARATUS FOR MONITORING THE MOLECULAR WEIGHT OF HYDROCARBON MIXTURES

CROSS-REFERENCE TO RELATED APPLICATION

This application is related to a co-pending application by the same inventor, Ser. No. 811,056 filed Mar. 27, 1969, now U.S. Pat. No. 3,557,609 titled "Method and Apparatus for Monitoring the Paraffinicity Characterization of Hydrocarbon Mixtures".

BACKGROUND OF THE INVENTION

1. Field of the Invention

This invention concerns a method and apparatus for determining a useful characteristic of hydrocarbon mixtures. More specifically, it concerns a method and apparatus that makes use of the Watson-Nelson characterization factor along with the API gravity so as to determine the molecular weight.

2. Description of the Prior Art

In my above-mentioned co-pending application, I have disclosed a method and apparatus for monitoring the paraffinicity characterization factor of hydrocarbon mixtures. That characterization factor is a useful tool for describing by a single numerical quantity the relative paraffinicity of a petroleum crude oil or a fraction thereof. Such characterization factor was first described many years ago, as has been noted in my copending application. However, the ability to monitor it continuously was not known and this is very useful, as has also been noted in the co-pending application. But, there was no thought of using that characterization factor in any particular manner and I have now discovered a way of monitoring the molecular weight of hydrocarbon mixtures. Prior to my above-mentioned co-pending application, there was not any feasible way to monitor in a continuous manner both the API gravity and the Watson-Nelson characterization factor of a hydrocarbon stream.

SUMMARY OF THE INVENTION

Briefly, the invention concerns a method for generating a signal representative of the molecular weight of a hydrocarbon mixture. The method comprises the step of sensing a physical property of said hydrocarbon mixture representative of the gravity of said mixture and providing a first signal representative of said gravity. It also comprises the steps of sensing a physical property of said hydrocarbon mixture representative of the viscosity thereof and providing a second signal representative of said viscosity, and deriving a third signal representative of the Watson-Nelson characterization factor by combining said first and second signals in accordance with a predetermined empirical relationship relating said characterization factor with said viscosity and said gravity of the hydrocarbon mixture. Finally, it also comprises the step of deriving a fourth signal representative of said molecular weight by combining said first and third signals in accordance with a predetermined empirical relationship relating said molecular weight with said characterization factor and said gravity of the hydrocarbon mixture.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENTS

In connection with various petroleum products and particularly heavy hydrocarbon streams, the molecular weight is a quantity of considerable interest. For example, many physical properties are available on the basis of "per gram mole" or "per pound mole", whereas practical measurements are usually "per gram" or "per pound". Thus, a value for the molecular weight is needed to convert from one basis to the other.

While there have been some correlations developed which in graphic form related molecular weight to API gravity for various values of the Watson-Nelson characterization factor, this was developed from individual data measurements. Therefore, in order to make determinations of molecular weight, it was necessary to measure or otherwise determine the API gravity and the characterization factor by tedious test procedures for a given sample of a hydrocarbon stream. Consequently, it has not been feasible heretofore to monitor a stream and continuously determine the molecular weight thereof.

I have discovered that there is an equation which closely defines the molecular weight in terms of the characterization factor and the gravity. Such equation may be expressed as follows:

$$MW = \exp\left\{ \ln\left[\exp(a+bK) + \exp(c+dK)\right] + m(G-30)\right\} \quad (1)$$

where
$MW$ = molecular weight
$K$ = Watson-Nelson characterization factor
$G$ = API gravity at 60°F, and
$a, b, c, d$ & $m$ = constants In this form of expressing the equation, the abbreviations have the following meanings:
ln means natural logarithm of
exp means $e$ raised to the power, where $e$ is the base of the natural logarithms.

Figure 1:
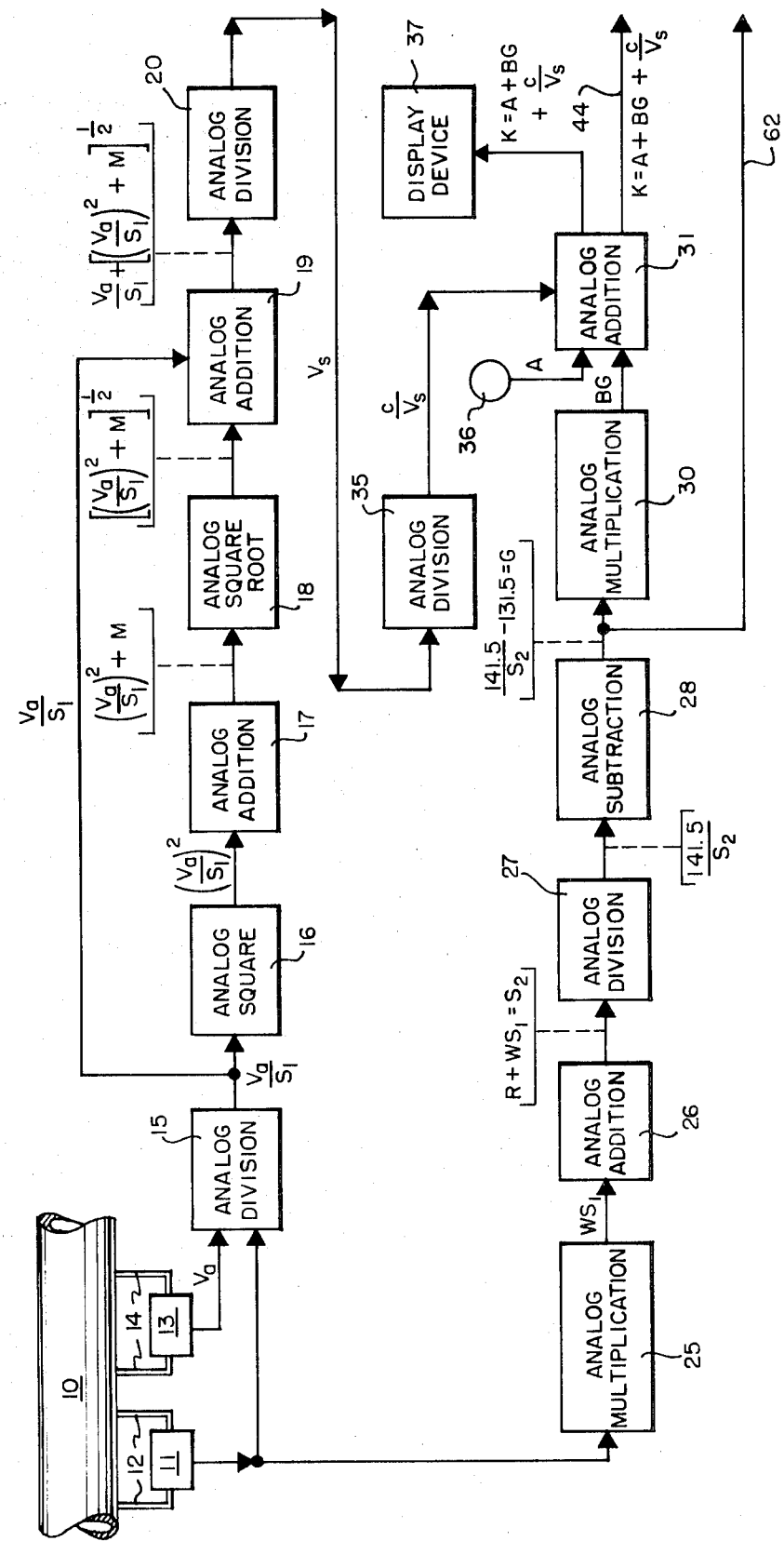
FIG. 1 is a schematic block diagram illustrating an example of a system for carrying out part of the invention and FIG. 2 is another schematic block diagram illustrating an example of an additional system that may make use of outputs from the FIG. 1 system and is useful in practicing the invention.

Since the two variables in the foregoing equation (1) are the Watson-Nelson characterization factor and the API gravity, these values may be obtained in a continuous manner as described in my above noted co-pending application. Then these signals or calculated values may be applied to analog or digital computing apparatus in order to provide a continuously derived signal representing the molecular weight. Thus referring now to FIG. 1, which is a block diagram schematic, there is shown a conduit 10 carrying a typical refinery process hydrocarbon stream, such as a petroleum crude, or petroleum fraction. There is connected to the conduit 10 a density sensing instrument 11 which receives a small side stream of the hydrocarbon mixture through a conduit 12. The side stream is in turn returned to the conduit 10 after passing through the density sensing instrument. The instrument 11 is of the vibrating density cell type which includes output electronics for providing a signal corresponding to the specific gravity of the sampled side stream. Also connected to the conduit 10 is a viscosity sensing instrument 13, which similarly receives a small side stream of the hydrocarbon mixture through a conduit 14, which is in turn returned to the conduit 10 after passing through the latter instrument. The viscosity instrument 13 is of the vibrating probe type which includes output electronics for providing a signal corresponding to the viscosity of the sampled side stream. To provide the above signals, suitable measuring instruments have been found to be the Dynatrol CL-10TY Series density cell and the Dynatrol CL-10RV series viscosity detector. Both instruments are manufactured by Automation Products, Inc., Houston, Texas.

The specific gravity and absolute viscosity signals, from the sensors 11, 13, are carried by suitable signal carrying means to a conventional analog division device 15 which divides the latter signal by the former and provides an analog output signal corresponding to the quotient, namely, $V_a/S_1$. A suitable analog device which can be used to perform the division is that manufactured by Electronics Associates Inc., Long Branch, New Jersey, under the designation Pace PC-12 Quarter Square Multiplier, Type 7.081. The quotient signal, from the analog division device 15, is carried to a conventional analog squaring device 16 which provides an output signal corresponding to the square of its input signal, namely, $(V_a/S_1)^2$. For this purpose a second multiplier, the same as specified above for the device 15, can be used. The signal from the squaring device 16 is, in turn, carried to a conventional analog addition device 17 which adds the constant $m$ to its input signal, and provides an analog output signal corresponding to this sum. For this purpose an analog addition device similar to that manufacturer by Electronic Associates Inc. under the designation Pace PC-12 Operational Amplifier, Type 6.368, and Amplifier Network, Type 12.782, can be used coupled to a potentiometer and regulated voltage source, not shown. By manual operation of the potentiometer the constant $M$ can be entered into the system pursuant to its selection based on the temperature of the hydrocarbon stream. The sum signal, from the addition device 17, is carried to a conventional analog square root device 18 which provides an analog signal corresponding to the square root of its input signal, namely $[(V_a/S_1)^2 + M]$. The latter signal is in turn carried to a conventional analog addition device 19 which is similar to the analog addition device 17. Also carried to the analog addition device 19 is the quotient signal from the analog division device 15. The analog addition device 19 provides an output signal corresponding to the sum of its two input signals. This sum signal is in turn carried to a conventional analog division device 20 where the latter signal is divided by the constant 0.438. The analog division device 20 can be a simple d.c. amplifier having a gain factor adjusted to correspond to the division of its input signal by the constant 0.438. It can be seen that the output signal provided by the analog division device 20 corresponds to the Saybolt Universal Viscosity, $V_s$, of the hydrocarbon mixture, in accordance with the equation described in my co-pending application.

The specific gravity signal, from the sensing instrument 11, is also carried to a conventional analog multiplication device 25, which multiplies the specific gravity signal by the constant $W$ and provides an output signal corresponding to this product. The analog multiplication device 25 can be a simple d.c. amplifier incorporating a manually adjustable gain feature such as a potentiometer in its feedback circuit. By manual operation of such a potentiometer the multiplication device can be adjusted to apply the proper value of the constant $W$ which is selected in accordance with the temperature of the hydrocarbon stream. The product signal, thus developed, is carried to a conventional analog addition device 26 which adds to this product signal the constant R. The analog addition device 26 is similar in construction to the addition device 17 including a manual entry provision for entering into the system of the value R which is selected in accordance with the temperature of the stream. It can be seen that the sum signal provided by the analog addition device 26 corresponds to the specific gravity of the hydrocarbon mixture corrected to a standard temperature of 60°F. The devices 25 and 26 can be omitted if one is prepared to accept a compromise in the accuracy of the system, by not correcting the specific gravity to the standard temperature, or, if the temperature of the hydrocarbon mixture is maintained in the vicinity of 60°F.

The specific gravity signal $S_2$ is carried from the analog addition device 26 to a conventional analog division device 27 which divides the constant 141.15 by the specific gravity signal $S_2$. The quotient signal from the analog division device is, in turn, carried to a conventional analog subtraction device 28 which is adapted to subtract the constant 131.15 from the latter quotient signal and provides an output signal corresponding to this difference. It will be understood from the relationships described in my co-pending application that the output signal of the subtraction device 28 corresponds to the API gravity, $G$, of the hydrocarbon mixture.

The API gravity signal $G$ from the analog subtraction device 28 is carried to a conventional analog multiplication device 30 which is adapted to multiply the gravity signal by the constant B selected in accordance with the temperature of the stream. The multiplication device 30 can be a simple d.c. amplifier incorporating a suitable manually operable gain adjustment provision, such as a potentiometer in its feedback circuit, so that the appropriate value of the constant B can be entered into the system. The output signal provided by the latter device corresponds to the product BG. This signal is in turn carried to a conventional analog addition device 31 which is adapted to sum three input input signals as discussed below.

The viscosity signal $V_s$, provided by the analog division device 20, is carried to a conventional analog division device 35 which is adapted to divide the constant C by the viscosity signal $V_s$. For this purpose a division device the same as that described above as the analog division device 15 can be used coupled to a potentiometer and regulated voltage source whereby the value C can be entered into the system pursuant to its selection in accordance with the temperature of the stream. The quotient signal provided by the analog division device 35 is, in turn, carried to the analog addition device 31. Also connected with the analog division device 31 is a potentiometer 36, which is, inturn, connected to a regulated voltage source, not shown. The potentiometer 36 is manually set to provide a signal proportional to the constant A, of the equation described in my co-pending application. The setting is selected in accordance with the temperature of the stream. This signal is carried to the analog addition device 31. The analog addition device 31 sums its three input signals and provides an output signal corresponding to this sum. A suitable addition device that can be used for this purpose is manufactured by Electronics Associates Inc., Long Branch, New Jersey, under the designation of a Pace PC-12 Operational Amplifier, Type 6.368 coupled with two Amplifier Networks, Type 12.782.

Figure 2:
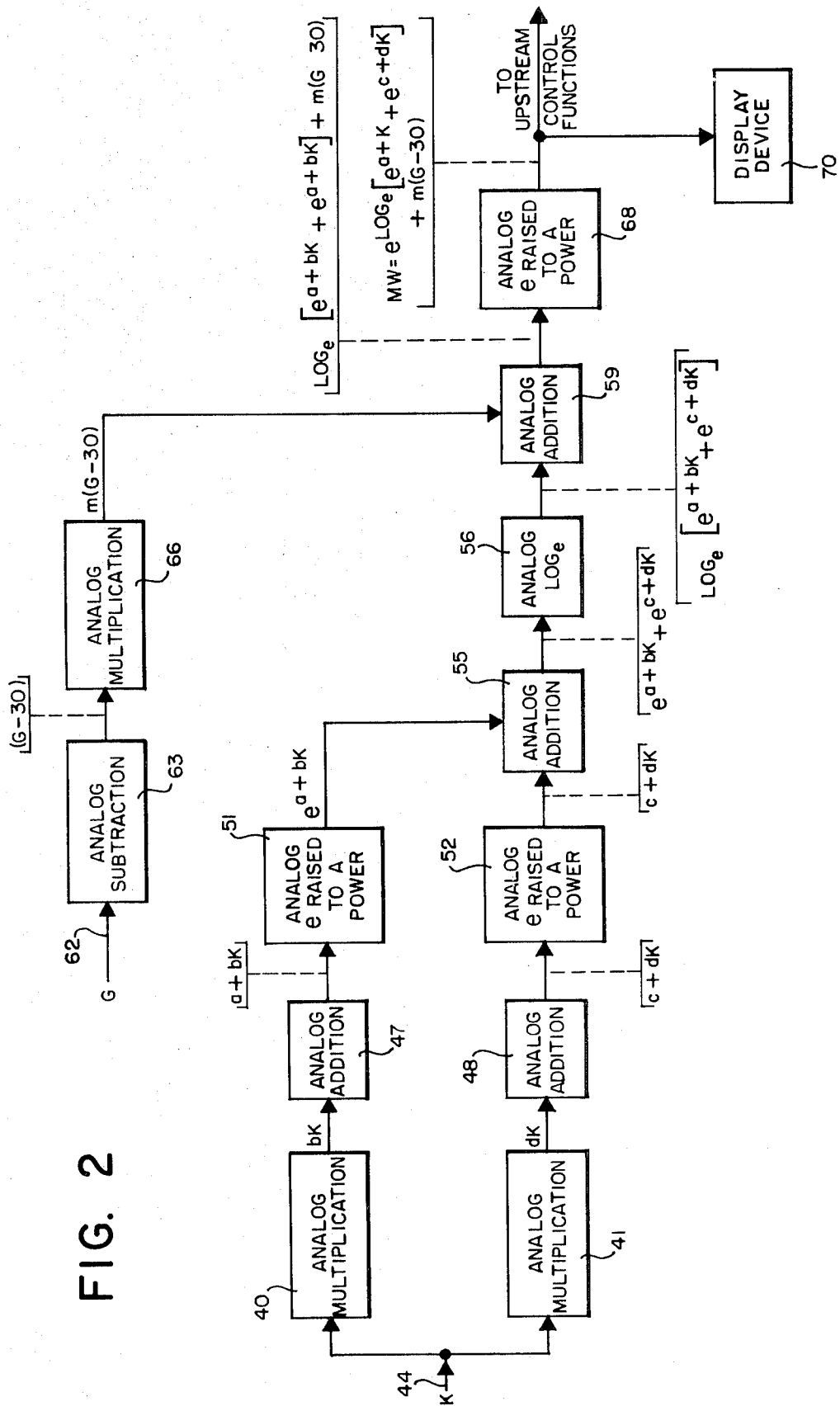

It can be seen that the output signal from the analog addition device 31 corresponds to the Watson-Nelson characterization factor, $K$, in accordance with the equation described in my co-pending application. This signal is, in turn, carried to a suitable display device 37, such as a chart recorder or a display meter, where the signal can be observed or recorded. The characterization factor signal is also transmitted to a pair of analog multiplication devices 40 and 41 (see FIG. 2) as indicated by an arrow 44 in FIG. 1 and FIG. 2 that branches to go into the multiplication devices 40 and 41.

As was pointed out above with reference to multiplication device 25, the analog multiplication devices 40 and 41 can be simple d.c. amplifiers incorporating manually adjustable gain features such as potentiometers in the feedback circuits. By manual operation of such potentiometers these multiplication devices can be adjusted to apply the proper value of the constants b and d which have preferred values as will be noted hereafter.

The product signals thus developed are carried to a pair of conventional analog addition devices 47 and 48 which add the product signals to the constants $a$ and $c$ respectively. These analog addition devices 47 and 48 are similar in construction to the addition devices 17 and 26 including manual entry provisions for entering into the system the values $a$ and $c$ which have preferred values as will be pointed out hereafter.

The characterization factor signal $K$ after the multiplications and additions is carried to analog devices 51 and 52 which perform the computational function of raising the natural logarithm base e to the powers $a+bK$ and $c+dK$ respectively. The devices 51 and 52 can be conventional analog computing components such as those marketed by Electronic Associates Inc. or a Wang electronic calculator manufactured by Wang Laboratories, Inc., Tewksbury, Massachusetts.

The signals representing the exp $(a+bK)$ and exp $(c+dK)$ terms of equation (1) above, are carried to an analog addition device 55 which adds these input signals and provides an analog output signal corresponding to the sum. Appropriate equipment for carrying this out would be like that manufactured by Electronics Associates Inc. under the trade name Pace.

The summation signal from device 55 is carried to analog device 56 that performs the computational function of taking the natural logarithm of this summation signal. Again in this case, there is conventional analog computing equipment which can be used. For example, there is equipment like various Wang electronic calculators manufactured by Wang Laboratories, Inc. of Tewksbury, Massachusetts.

The natural logarithm signal is carried into one input of an analog addition device 59 which also receives another input as discussed below. Device 59 may be conventional as indicated above with respect to the other addition devices.

It can be seen that the output signal from the subtraction device 28 (see FIG. 1) is also transmitted over another path as indicated by an arrow 62 (FIG. 1 and FIG. 2) to the input of an analog subtraction device 63. This is the API gravity signed G of the hydrocarbon mixture and the subtraction device 63 is adapted to subtract the constant 30 from that gravity signal and provide an output corresponding to the difference.

The difference signal represents the term $(G-30)$ of the equation (1) and it is carried to analog multiplication device 66. A suitable device can be like those referred to above in respect to the multiplication devices 25 or 30. It multiplies the difference signal by the constant m and provides an output signal corresponding to this product. Such product signal represents the term $m(G-30)$ of the equation (1) and it is carried to the other input of the addition device 59.

It can be seen that the output signal from the analog addition device 59 corresponds to the exponent term of the equation (1) that relates the Watson-Nelson characterization factor $K$ to the API gravity $G$. This signal is carried to a device 68 which performs the computational function of raising the natural logarithm base e to the power represented by the sum of: the natural logarithm of the sum of the exponential quantities (output of device 56); and the summation term involving API gravity (output of device 66). As in the case of devices 51 and 52, this device 68 performs the computational function of raising the natural logarithm base $e$ to the power $ln\ [\exp(a+bK) + \exp(c+dK)] + m(G-30)$. And, again, this device 68 can be a conventional analog computing component, e.g. a Wang electronic calculator.

It can be seen that the output signal from device 68 corresponds to the molecular weight $MW$ of the hydrocarbon stream, in accordance with equation (1) above. This signal is in turn carried to a suitable display device 70, such as a chart recorder or a display meter, where the signal can be observed or recorded. The molecular weight signal can also be transmitted to upstream processing units to be used for control purposes.

It will be appreciated by those skilled in the art that while electrical analog computing elements have been described, equivalent computation elements can be used, such as those of the pneumatic type, resulting in an equivalently operable system. It will also be appreciated by those skilled in the art that a digital computer can be utilized to perform the various computation steps. In this instance the values of the constants A, B, C, R, W and M as well as a, b, c, d and m would be pre-programmed in the computer, and information of the hydrocarbon temperature would be made available to the computer. Also, the sensing instruments 11 and 13 would be adapted to provide their respective signals in digital format. The advantage of the use of a digital computer lies, of course, in its accuracy and speed.

It may be noted that the computational steps could be carried out with the use of common logarithms instead of Naperian (natural) logarithms, and only minor modification of the steps employed would be required.

It has been found that the results of the determinations of the molecular weight in accordance with the equation (1) of this invention give good results as closely agreeing with a graphical correlation over the following ranges:

$0° \leq G \leq 35°API$
$10.0 \leq K \leq 12.75$
$100 \leq MW \leq 550$ it will be observed that these ranges include heavy petroleum fractions that include virgin wax distillates, refined distillates, extracts, virgin naphthene distillates, and mixtures of these.

The constants employed in the equation (1) have the following preferred values: $a = -2.353$; $b = 0.677$; $c = -30.052$; $d = 2.7726$; and $m = -0.042$. However these might vary somewhat in the following ranges:

$-2.5 \leq a \leq -2.0$
$0.60 \leq b \leq 0.70$
$-31.000 \leq c \leq -29.000$
$2.500 \leq d \leq 3.000$
$-0.050 \leq m \leq -0.030$ While the invention has been described above in considerable detail in accordance with the applicable statutes, this is not to be taken as limiting the invention, but merely as being descriptive thereof.

I claim:

1. A method for generating a signal representative of the molecular weight of a hydrocarbon mixture comprising the steps of:
   a. sensing a physical property of said hydrocarbon mixture representative of the gravity of said mixture and providing a first signal representative of said gravity;
   b. sensing a physical property of said hydrocarbon mixture representative of the viscosity thereof and providing a second signal representative of said viscosity;
   c. deriving a third signal representative of the Watson-Nelson characterization factor by combining said first and second signals in accordance with a predetermined empirical relationship relating said characterization factor with said viscosity and said gravity of said hydrocarbon mixture; and
   d. deriving a fourth signal representative of said molecular weight by combining said first and third signals in accordance with a predetermined empirical relationship relating said molecular weight with said Watson-Nelson characterization factor and said gravity of said hydrocarbon mixture.

2. The method according to claim 1 wherein said first and second signal providing steps include providing said first and second signals representative of the API gravity and the Saybolt Universal viscosity, respectively, of said hydrocarbon mixture, and wherein said combining step (c) comprises
   c. combining said first and second signals to provide said third signal representative of said characterization factor, said combining being performed in accordance with said predetermined relationship relating said Saybolt Universal viscosity and said API gravity with said characterization factor, the general form of said relationship being substantially in accordance with the following equation:

$$K = A + BG + (C/V_s)$$

where:
$K$ = the Watson-Nelson characterization factor of said hydrocarbon mixture,
$V_s$ = the Saybolt Universal viscosity of said hydrocarbon mixture,
$G$ = the API gravity of said hydrocarbon mixture, and
$A, B,$ and $C$ are predetermined constants related to the temperature of said hydrocarbon mixture, and wherein said combining step (d) comprises
   d. combining said first and third signals to provide said fourth signal representative of said molecular weight, said combining being performed in accordance with said predetermined relationship relating said API gravity and said Watson-Nelson characterization factor with said molecular weight, the general form of said relationship being substantially in accordance with the following equation:

$$MW = \exp\left\{\ln\left[\exp(a+bK) + \exp(c+dK)\right] + m(G-30)\right\}$$

where:
$MW$ = the molecular weight of said hydrocarbon mixture,
$K$ = the Watson-Nelson characterization factor of said hydrocarbon mixture,
$G$ = the API gravity of said hydrocarbon mixture, and
$a, b, c, d,$ and $m$ are predetermined constants.

3. Apparatus for generating a signal representative of the molecular weight of a hydrocarbon mixture from a source thereof, comprising:
   a. a first means operatively coupled with said source of hydrocarbon mixture for sensing a physical property thereof representative of the gravity of said hydrocarbon mixture and for providing a first signal representative of said gravity;
   b. second means operatively coupled with said source of hydrocarbon mixture for sensing a physical property thereof representative of the viscosity of said hydrocarbon mixture and for providing a second signal representative of said viscosity;
   c. third means operatively coupled with said first and second means for deriving a third signal representative of the Watson-Nelson characterization factor by combining said first and second signals in accordance with a predetermined empirical relationship relating said characterization factor with said gravity and said viscosity of said hydrocarbon mixture; and
   d. fourth means operatively coupled with said first and third means for deriving a fourth signal representative of said molecular weight by combining said first and third signals in accordance with a predetermined empirical relationship relating said molecular weight with said Watson-Nelson characterization factor and said gravity of said hydrocarbon mixture.

4. Apparatus according to claim 3 wherein said first and second signal providing means include means for providing signals representative of the API gravity and the Saybolt Universal viscosity, respectively, of said hydrocarbon mixture, and wherein said third means for deriving (c) comprises c. means for deriving said third signal substantially in accordance with said predetermined relationship relating said API gravity and said Saybolt Universal viscosity with said Watson-Nelson characterization factor, the general form of said relationship being substantially in accordance with the following equation:

$$K = A + BG + (C/V_s)$$

where:
- $K$ = the Watson-Nelson characterization factor of said hydrocarbon mixture,
- $V_s$ = the Saybolt Universal viscosity of said hydrocarbon mixture,
- $G$ = the API gravity of said hydrocarbon mixture, and
- $A$, $B$, and $C$ are predetermined constants related to the temperature of said hydrocarbon mixture, and wherein said fourth means for deriving (d) comprises d. means for deriving said fourth signal substantially in accordance with said predetermined relationship relating said API gravity and said Watson-Nelson characterization factor with said molecular weight, the general form of said relationship being substantially in accordance with the following equation:

$$MW = \exp\left\{\ln\left[\exp(a+bK) + \exp(c+dK)\right] + m(G-30)\right\}$$

where:
- $MW$ = the molecular weight of said hydrocarbon mixture,
- $K$ = the Watson-Nelson characterization factor of said hydrocarbon mixture, and
- $a, b, c, d$, and $m$ are predetermined constants.

* * * * *